United States Patent [19]

Krause

[11] Patent Number: 4,547,107

[45] Date of Patent: Oct. 15, 1985

[54] INTERMODAL RAIL TRUCK AND COUPLING SYSTEM

[76] Inventor: Robert A. Krause, 3300 Woodland, Ames, Iowa 50010

[21] Appl. No.: 590,210

[22] Filed: Mar. 16, 1984

Related U.S. Application Data

[63] Continuation-in-part of Ser. No. 303,718, Sep. 21, 1981, abandoned, which is a continuation-in-part of Ser. No. 234,647, Feb. 17, 1981, Pat. No. 4,416,571.

[51] Int. Cl.⁴ ............................................... B60F 1/04
[52] U.S. Cl. ................................. 410/58; 105/4 R; 105/215 C; 213/4
[58] Field of Search ............. 105/4 A, 3, 4 R, 215 R, 105/215 C, 159; 410/58, 61, 64; 213/4, 5

[56] References Cited

U.S. PATENT DOCUMENTS

| | | | |
|---|---|---|---|
| 2,164,703 | 7/1939 | Elsey | 213/4 |
| 2,200,219 | 5/1940 | Reid | 213/4 |
| 2,212,646 | 8/1940 | Nekola | 213/4 |
| 2,632,572 | 3/1953 | Gilchrist | 213/4 |
| 2,709,969 | 6/1955 | Andert | 410/53 |
| 2,718,195 | 9/1955 | Bock et al. | 213/5 |
| 2,841,094 | 7/1958 | Schumacher | 410/53 |
| 3,762,337 | 10/1973 | McKeon et al. | 105/159 |
| 4,385,857 | 5/1983 | Willetts | 105/224.1 |
| 4,416,571 | 11/1983 | Krause | 410/53 |
| 4,452,147 | 6/1984 | Jwuc | 105/4 A |

Primary Examiner—Craig R. Feinberg
Assistant Examiner—David A. Okonsky
Attorney, Agent, or Firm—Zarley, McKee, Thomte, Vorhees & Sease

[57] ABSTRACT

The intermodal rail truck and coupling system for the coupling of two intermodal containers, two conventional rail cars, or an intermodal container and a conventional rail comprising a rail truck frame having a central longitudinal axis and wheel supports for rotatable securement of conventional rail wheels for use on conventional rails. Two conventional rail car coupler means are positioned at opposite ends of said frame along said longitudinal axis, and are vertically adjustable to a height equal to conventional rail car couplers which defines the load line of conventional rail cars, and are lowerable below that load line when not used. Two fifth-wheel pancake members are also positioned at opposite ends of said frame along said longitudinal axis and have means for receipt and pivotable securement of fifth-wheel kingpins of intermodal containers. These fifth-wheel pancake members are pivotable around a vertical axis so that the intermodal kingpins may be removed transversely of the longitudinal axis of the frame and the pancakes are vertically adjustable so they can be positioned to allow said intermodal containers to be level with the load line of conventional rail cars or can be raised to raise the intermodal containers to allow removal. A linkage means is provided which releasably links the intermodal containers or conventional rail cars which are operatively attached to said rail truck coupling system so that a uniform load line is formed between all members attached to said rail truck.

24 Claims, 16 Drawing Figures

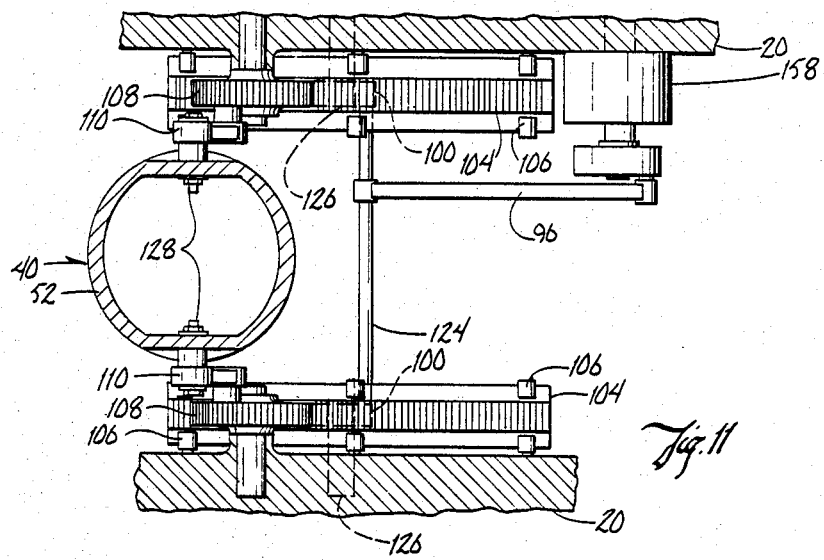
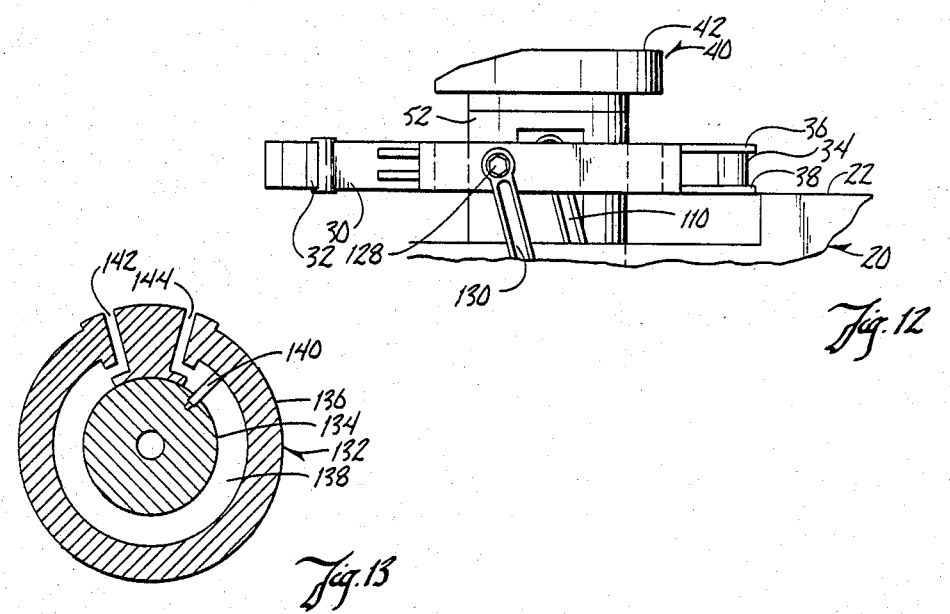
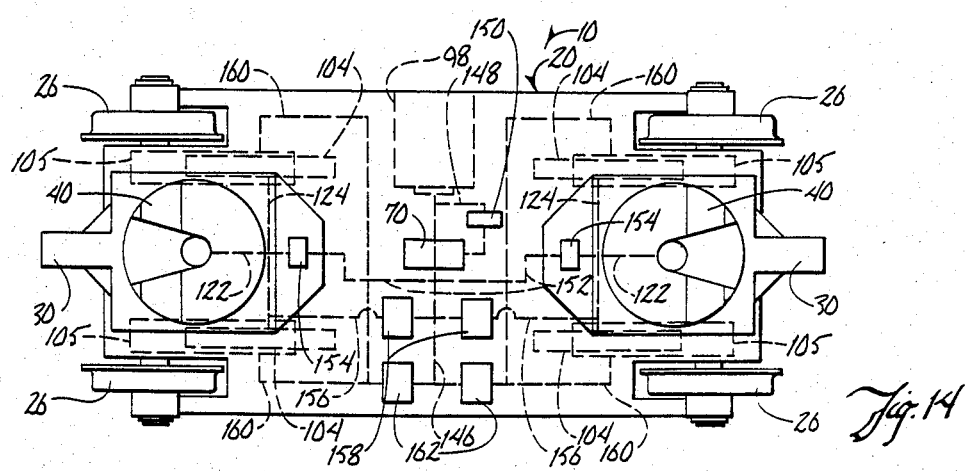

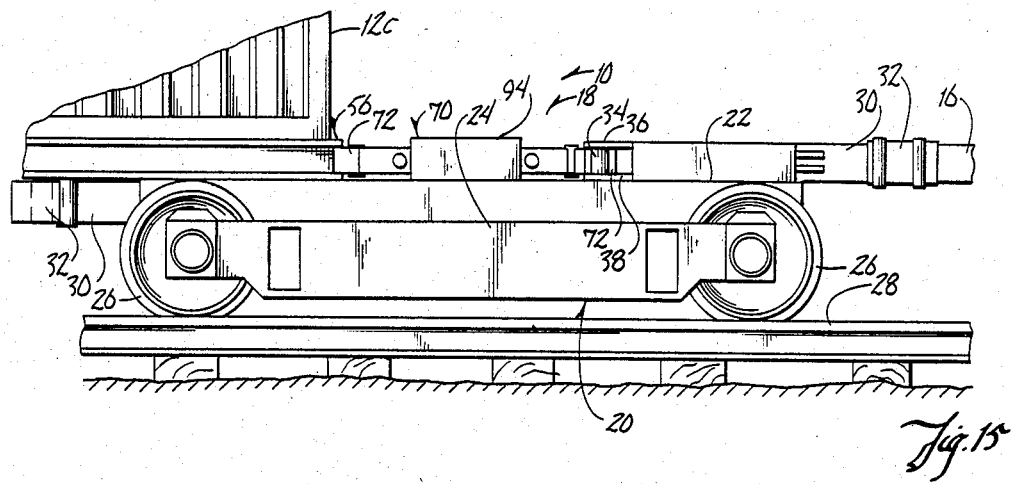
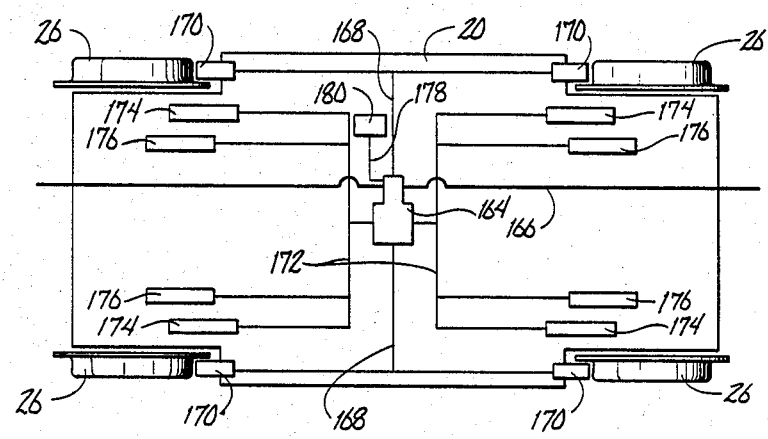

INTERMODAL RAIL TRUCK AND COUPLING SYSTEM

This application is a continuation-in-part of co-pending application Ser. No. 303,718, now abandoned, filed Sept. 21, 1981, which was a continuation-in-part of Ser. No. 234,647, filed Feb. 17, 1981, now issued U.S. Pat. No. 4,416,571.

BACKGROUND OF THE INVENTION

I. Field of Invention

This invention relates to railroad transportation systems, and in particular, to intermodal rail truck and coupling systems to enable intermodal containers to be efficiently and effectively adapted to rail use and being allowable to be coupled to conventional rail cars. The present invention forms an improvement to the co-pending application referred to above, which was a continuation-in-part to U.S. Pat. No. 4,416,571, and is an improvement to that patent also.

II. Problems in the Art

The above-referred to U.S. Pat. No. 4,416,571, commonly owned by the applicant, reveals a truck and rail transportation system which allows intermodal containers to be efficiently converted from truck to rail modes and visa versa by utilizing semi-tractor-type fifth-wheel pancakes which are pivotable to allow kingpins on the intermodal containers to be received and pivotally secured. As is discussed in the co-pending application, to preserve the integrity of the system, the load line, or stress line along the train of containers and cars must be at as close to a uniform height as possible. Because of the high stresses generated by rail transportation, an uneven load line creates drastic problems which could lead to stress failure, damage, or other detrimental effects.

The co-pending application discusses how the disparity in load line throughout the system disclosed in the patent can be lessened. However, it still does not present a uniform load line the exact height of the load line through conventional rail cars. Conventional rail cars distribute the load line through the main stress carrying center beam of the rail cars, which is along their longitudinal axis and which is at the height of the conventional rail car couplers at opposite ends of conventional rail cars. Thus, the device discussed in the co-pending application is still subject to eccentric and disaligned stress forces caused by the fifth-wheel connection to the intermodal containers being offset with respect to the plane of connection of the prime mover of the train to the intermodal rail truck.

Furthermore, the co-pending application discusses the need for the fifth-wheel pancake assemblies to be raisable and pivotable to allow intermodal containers to be raised to a height where a highway mode tractor and tandem axle rear wheels can be inserted thereunder and thereafter transversely removed from the pancakes.

It is therefore an object of this invention to provide an intermodal rail truck and coupling system which obtains a uniform load line along the various intermodal containers and conventional rail cars attached to one another.

A further object of this invention is to provide an intermodal rail truck and coupling system which automatically and remotely couples intermodal containers or conventional rail cars to produce the uniform load line at the height of a conventional rail car load line.

A further object of this invention is to provide an intermodal rail truck and coupling system which automatically and remotely couples intermodal containers or conventional rail cars to produce the uniform load line at the height of a conventional rail car load line and which also allows for required pivoting of intermodal containers or conventional rail cars as to one another to facilitate rail car pivoting around curves in the rails.

Another object of this invention is to provide an intermodal rail truck and coupling system which has conventional rail car couplers which are lowerable below the conventional load line of conventional rail cars when not in use.

Another object of this invention is to provide an intermodal rail truck and coupling system which has pivotable and raisable fifth-wheel pancake members which are positionable so that intermodal containers pivotally attached thereto can be positioned so as to be along said load line of conventional rail cars and then which are raisable to pivot and raise said intermodal containers so that they can be removed transversely of longitudinal axis of the intermodal rail truck for highway mode purposes.

A further object of this invention is to provide an intermodal rail truck and coupling system which can couple two intermodal containers, two conventional rail cars, or an intermodal container and a conventional rail car while at the same time maintaining a uniform load line therethrough, at the height of a conventional load line of a conventional rail car.

A further object of this invention is to provide an intermodal rail truck and coupling system whereby the maintenance of a uniform load line, the lowering of the conventional coupler means, and the raising and pivoting of the fifth-wheel pancakes can be achieved automatically by remote control.

SUMMARY OF THE INVENTION

This invention utilizes a rail truck frame having conventional rail wheels for operation on conventional railroad rails. The rail truck frame facilitates the coupling of intermodal containers described in U.S. Pat. No. 4,416,571 or the coupling of an intermodal container and a conventional rail car or simply transporting the rail truck between two conventional rail cars by presenting a dual coupling system.

The dual coupling system consists of conventional rail car couplers for selective coupling to conventional rail cars if needed, and fifth-wheel pancake members for selective coupling to the intermodal containers, if needed.

The conventional rail car couplers are vertically adjustable having one position which is a height equal to the height of conventional rail car couplers, and being lowerable below that height when not coupled to a conventional rail car. The height of a conventional rail car coupler is the same as the load line of conventional rail cars. It is desirable to have a uniform load line throughout the rail frame so that stress forces are distributed uniformly.

The fifth-wheel pancakes are similar to conventional highway tractor trailer fifth-wheel pancakes having a slot to which a kingpin from the intermodal container is slidable through into the central aperture wherein the kingpin is received and secured. The underside area of the intermoadl continues around the kingpin abuts the top of the fifth-wheel pancake and the kingpin allows the intermodal container to pivot thereabout when the train is going around curves.

As disclosed in U.S. Pat. No. 4,416,571, the fifth-wheel pancakes are pivotable about their vertical axis so that the intermodal containers can be slid off the fifth-wheel pancakes transversely of the longitudinal axis of the rail truck and train for side loading and unloading of intermodal containers. Furthermore, the fifth-wheel pancakes are vertically adjustable from a lower position whereby the intermodal containers are held so that their load line is equal to the load line of conventional rail cars to upper positions whereby equipment to move said intermodal containers transversely of the longitudinal axis of the train can operate underneath and the kingpins can slide freely away from fifth-wheel pancakes without interference with the rail truck.

The vertical adjustability allows the fifth-wheel pancakes to be positioned to optimize and make uniform the load line of the train when being pulled along rails, and then allows easy and efficient coupling and removal of the intermodal containers when the train is at rest.

A linkage means is provided on the rail truck frame which selectively can interconnect whatever is attached to opposite ends of said rail truck along the load line of the conventional rail cars to transmit that load line along the entire length of the train, regardless of whether it is composed of intermodal containers or conventional rail cars. The motive means of the train will always require the succeeding cars to have a load line at that conventional rail car height.

The linkage means can take on many forms or shapes but is required to maintain a rigid load line in the horizontal plane defined by the height of conventional rail car couplers. Concurrently, the linkage means must allow for some pivoting of the intermodal containers around the vertical axis of the pancake fifth-wheels when the train is going around corners.

The means for vertically adjusting the fifth-wheel pancakes and couplers, and a means for operatively connecting the linkage means can take on different configurations, all within the scope of those skilled in the art.

The structure of the preferred embodiment which accomplishes these desirable invention results will next be described.

BRIEF DESCRIPTION OF THE DRAWINGS

FIG. 11 is a top cross-sectional view of the means for raising and lowering the fifth-wheel and the coupler means.

FIG. 12 is a partial side view of the means for lifting the fifth-wheel and the coupler means and their relationship to one another.

FIG. 13 is a cross-sectional schematic of a hydraulic motor.

FIG. 14 is a schematic of the power train and control system of the invention.

FIG. 15 is a side view of the invention as shown with an intermodal container coupled to one end and a conventional rail car coupled to the other end with the linkage means extended and secured along the train's load line.

FIG. 16 is a schematic of the air brake system and control means for locking the raising and lowering means of the invention.

DETAILED DESCRIPTION OF THE PREFERRED EMBODIMENT

Figure 1:
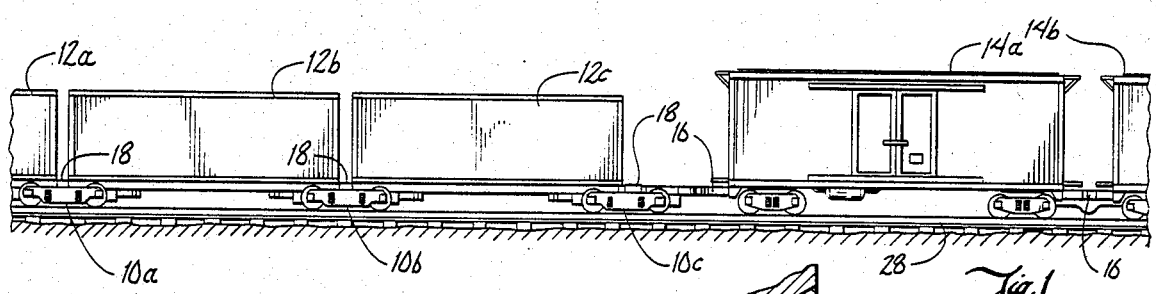
FIG. 1 is a partial side view of a train having intermodal containers and conventional rail cars coupled to the invention.
Figure 3:
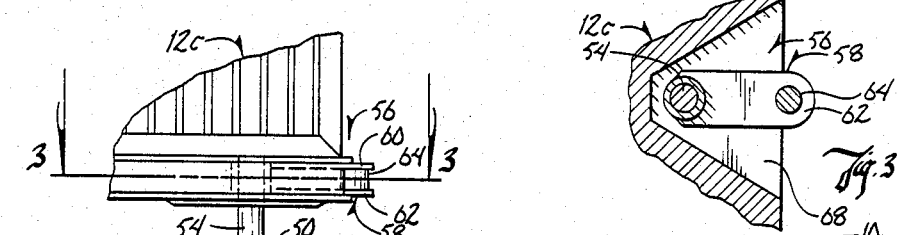
FIG. 3 is a partial bottom view of the coupler means and intermodal container taken along line 3—3 of FIG. 2.

In reference to the drawings, and in particular FIG. 1, there is shown three intermodal containers 12 (12a, 12b, 12c) coupled together by three of the invention 10 (10a, 10b, 10c). Two conventional rail cars 14a and 14b are coupled to one another by conventional rail couplers 16. Conventional rail car 14a is coupled to intermodal rail truck 10c by a conventional rail car coupler 16.

The load line of conventional rail cars 14 is defined along their longitudinal axis at the height of conventional couplers 16 of conventional rail cars 14. Intermodal rail trucks 10a and 10b have linkage means 18 which link between intermodal containers 12a, 12b and 12c, and between intermodal container 12c and conventional rail car 14a so that the load line of the entire train is maintained along the load line of the conventional rail car 14.

By referring to FIGS. 2–5, the exact structure of the preferred embodiment of the invention 10 can be more clearly seen. A rail truck frame 20 has a top surface 22, and wheel supports 24 which rotatably hold conventional wheels 26 in place for operation on conventional tracks 28. Rail truck frame 20 includes conventional suspension, and air braking systems known to those in the art.

Rail car couplers 30 are positioned on opposite ends of rail truck frame 20 and extend outwardly therefrom. Rail couplers 30 have automatic coupling hooks 32 at their outer end for coupling with conventional rail car couplers 16 of conventional rail cars 14. Auto coupling hooks 32 are also known to those skilled in the art.

Figure 2:
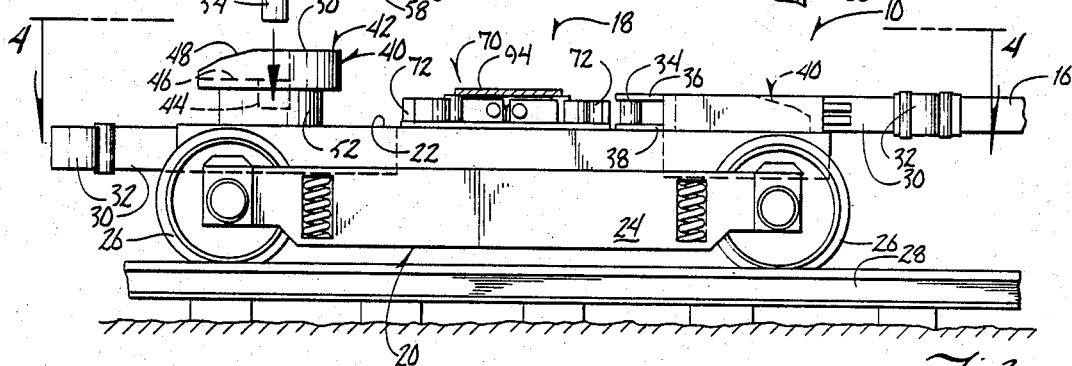
FIG. 2 is a side view of the invention showing the left pancake raised and the intermodal container exploded away from fifth-wheel and showing the right conventional coupler coupled to a conventional rail car coupler.
Figure 4:
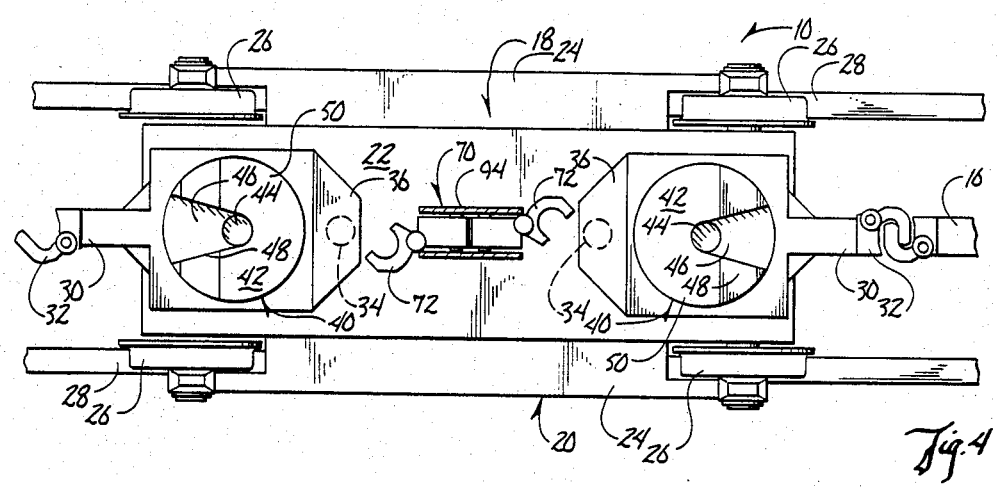
FIG. 4 is a top plan view of the invention taken along line 4—4 of FIG. 2.

Rail car couplers 30 are vertically adjustable and can be lowered into recesses in top surface 22 of rail truck frame 20 as shown by left rail car coupler 30 in FIG. 2, or can be raised to a level equal to conventional rail coupler 16 for coupling with conventional rail cars 14 as shown by the right rail car coupler 30 in FIG. 2. The lowering of rail car coupler 30 is such that it is below the level of conventional rail car coupler 16 so that it is out of way when not in use.

Rail car couplers 30 have linkage coupling posts 34 at their innerfacing ends. Linkage coupling posts 34 are cylindrical rigid posts held between upper plate 36 and lower plate 38 extending from rail car couplers 30.

Fifth-wheel pancakes 40 are positioned within rail car couplers 30 and are vertically adjustable from a position within an aperture rail car coupler 30, and therefore can be lowered flush with the top surface of rail truck frame 22, or they can be vertically raised above top surface 22, as shown by leftmost pancake 40 in FIG. 2.

The structure of fifth-wheel pancakes 40 consists of a circular striker plate 42 having a central aperture 44 and a slot 46 leading from one peripheral edge to said central aperture 44. The top surface of said striker plate 44 has a sloped or canted surface 48 along slot 46 up to a flat surface 50 surrounding central aperture 44 and the rest of top of striker plate 42. Striker plate 42 is rigidly connected to pancake base 52. Central aperture 44 may extend into pancake base 52 to a deeper depth than slot 46.

Pancake 40 functions to receive and pivotally secure fifth-wheel kingpin 54 of intermodal container 12, in the manner described in Pat. No. 4,416,571.

Fifth-wheel pancake 40 is pivotable about its vertical axis through central aperture 44 so that the orientation of slot 46 can be altered to allow kingpin 54 to be slidably removed from pancake 40 at attitudes transverse to rail tracks 28.

By referring to FIG. 2, the exploded view of intermodal container 12 with kingpin 54 is shown in its orientation to a raised fifth-wheel pancake 40.

It is to be noted that intermodal containers 12 have a pivot arm 58 which is pivotally connected to kingpin 54 and extends outwardly along the load line of said intermodal container 12. Pivot arm 58 is comprised of upper and lower plates 60 and 62 which sandwich a vertical coupling post 64 at their outermost ends. By referring to FIG. 3, it can be seen that a V-shaped opening in the bottom of intermodal container 12 allows pivot arm 58 to move through a distance on either side of kingpin 54.

Figure 5:
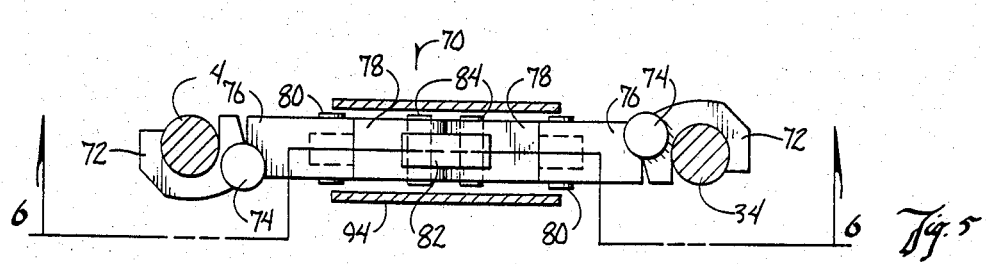
FIG. 5 is a top plan view partial sectional view of the linkage means of the invention.

Linkage means 70 exists in a central location on rail truck frame 20 and is retractable and foldable downwardly therein. Post locking hooks 72 are pivotally secured to the outermost ends of linkage means 70, and as shown in FIG. 5, operate to automatically grasp and lock onto either linkage coupling posts 34 of couplers 30 or vertical coupling post 64 of intermodal container 12, depending upon what is hooked up to what end of intermodal rail truck 10.

The operation of linkage means 70 shall next be described. By referring to FIGS. 6–8, structure of linkage means 70 can be more specifically understood and seen. It is to be understood that linkage means 70 automatically and remotely can link coupling post 34 or 64 when those posts are positioned along the desired load line. For example, in FIGS. 6–8, assume that the leftmost coupling post is a linkage coupling post 34 of an intermodal container 12 and that the right coupling post is vertical coupling post 64 of coupler means 30 and that coupler means 30 is in turn coupled to a conventional rail car 14.

Figure 6:
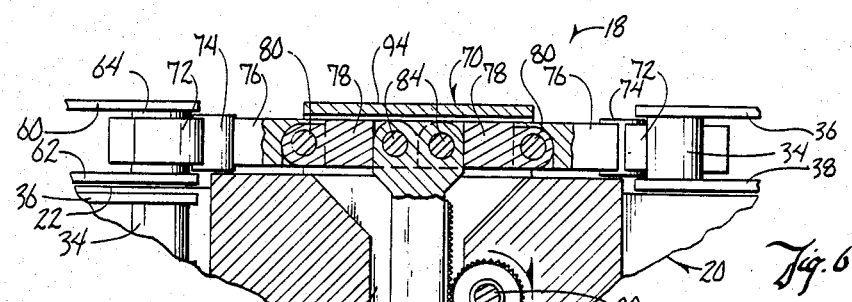
FIGS. 6–8 are cross-sectional side views of the linkage means of the invention.

FIG. 6 shows linkage means 70 fully extended and coupled to coupling post 34 and 64 by post locking hooks 72. Post locking hooks 72 are connected to pivot means 74. Pivot means 74 is mounted on the end of outer linkage arm 76. Outer linkage arm 76 is pivotally attached to inner linkage arm 78, pivoting as to each other around a horizontal transverse axis defined by pin 80. Inner linkage arms 78 are in turn pivotally attached to a vertical post 82 by horizontal pins 84.

Vertical post 82 has a tooth rack 86 in operative alignment with a tooth gear 88 rotatably mounted on spindle 90. Rotation of tooth gear 88 causes vertical post 82 to move upwardly or downwardly within Y-shaped space 92 in the top surface of 22 of rail truck frame 20. A hood or cover 94 extends over linkage means 70 and Y-shaped area 92 protecting them from the elements and from other parts or debris. FIG. 6 shows vertical post 82 in its highest position wherein inner linkage arm 78 and outer linkage arm 76 are fully extended horizontally between coupling post 34 and 64, post locking hooks 72 being secured thereto.

Figure 7:
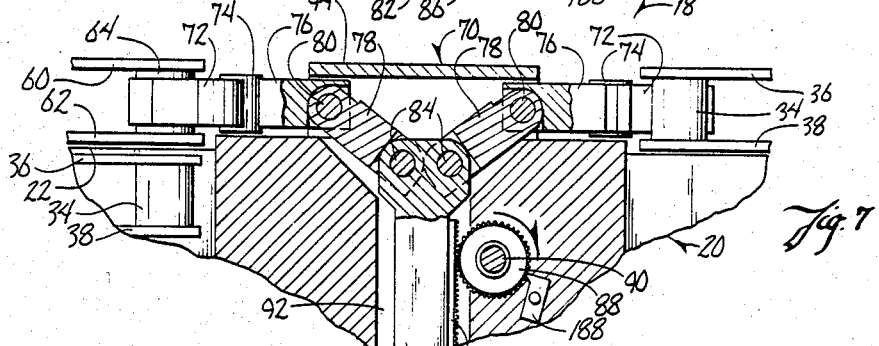

FIG. 7 illustrates that upon counterclockwise rotation of tooth gear 88, vertical post 82 is caused to travel downwardly in Y-shaped area 92 and inner and outer locking arms 78 and 76 hinge at pins 80 and 84 and follow vertical post 82. During this process, post locking hooks 72 pivot around pivot means 74 and begin releasing coupling posts 34 and 64.

Figure 8:
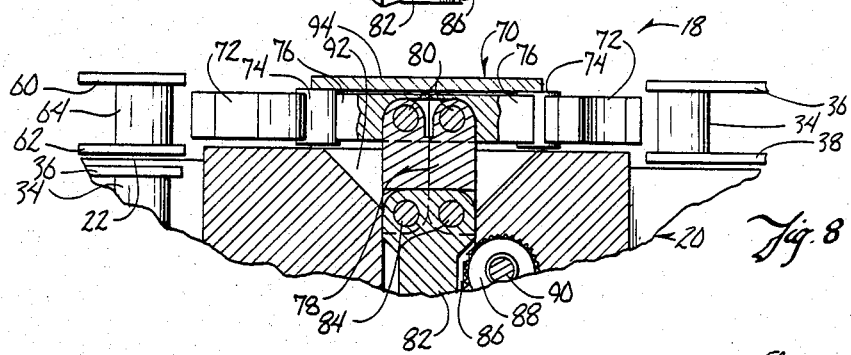

FIG. 8 shows that upon movement of vertical post 82 to its lowermost position, inner linking arms 78 have been folded to vertical positions and vertical post locking hooks 72 have completely unlocked from coupling posts 34 and 64 freeing them for removal or other operation.

By reversing the sequence of FIGS. 6–8, it can be seen how linking of coupling posts 34 and 64 is accomplished.

Figure 9:
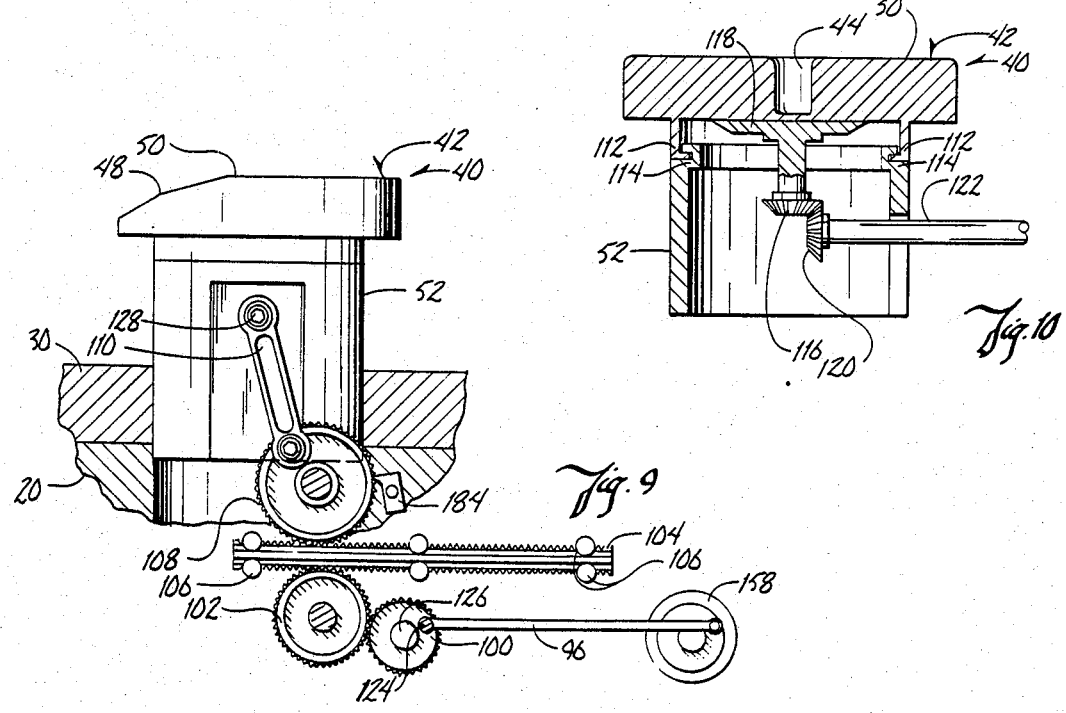
FIG. 9 is a side cross-sectional view of the means for raising and lowering pancake members and the coupler means.

By referring to FIG. 9, the means for vertically adjusting fifth-wheel pancakes 40 and coupler means 30 can be seen. The structure depicted in FIG. 9 is shown connected to fifth-wheel pancake 40, but it is to be understood that identical structure is implemented to raise and lower couplers 30. For simplicity, the structure is shown only as to pancake 40 in FIG. 9, but is shown schematically as to both pancake 40 and coupler 30 in FIG. 14. Clutch 158 is operatively connected to a motor 98. Motor 98 outputs rotary power and can be a hydraulic motor such as that shown in FIG. 13. Rod 96 is connected between clutch 158 and the side face of a reduction gear 100. Thus, upon operation of motor 98 and engagement of clutch 158, rod 96 can rotate reduction gear 100 in either direction. Reduction gear 100 is in turn operatively connected to rack drive gear 102. Rack drive gear 102 is operatively connected to a tooth rack 104 which is slidable through rollers 106. A drive gear 108 is operatively connected to the upper side of tooth track 104 and has a connecting arm 110 connected at its lower end to the side face of drive gear 108, and at its upper end to pancake base 52.

It can be seen that upon rotation of reduction gear 100 by rod 96 from motor 98, rack drive gear 102 rotates and causes tooth rack 104 to slide within rollers 106. This in turn causes drive gear 108 to turn and causes connecting arm 110 to move fifth-wheel pancake base 52 and fifth-wheel pancake 40 either upwardly or downwardly depending upon its direction or rotation.

All gears, namely reduction gear 100, rack drive gear 102, and drive gear 108 are rotatably mounted upon spindles which are secured to rail truck frame 20.

This structure is sometimes referred to as a Rhombic drive system and is known to those skilled in the art. It is again understood that identical structure is utilized to lower and raise couplers 30, the only difference being that connecting arm 110 is connected to coupler 30.

Figure 10:
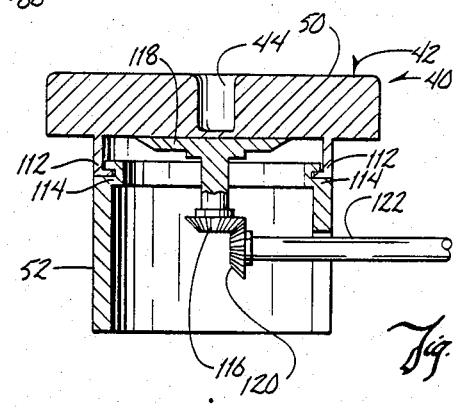
FIG. 10 is a side cross-sectional view of the means for pivoting the fifth-wheel pancakes.

The pivoting of fifth-wheel pancakes 40 is accomplished by means of structure shown in FIG. 10. Fifth-wheel pancake striker plate 42 is slidably rotatable around pancake base 52 by means of L-shaped in cross-section lip members 112 which are retained in U-shaped slots 114 of pancake base 52. A bevel gear 116 is mounted on a downwardly extending stem 118 rigidly attached to striker plate 42. Bevel gear 120 is engagable with bevel gear 116 and is connected to power shaft 122, which is connected to a clutch 154 which is connected to motor 98. Bevel gear 120 and power shaft 122 are stationary so that bevel gears 116 and 120 are engagable only when fifth-wheel pancakes 40 is in its lower position.

FIG. 11 illustrates the top view of the total combination shown in FIG. 9 for lifting fifth-wheel pancakes 40. The Rhombic drive system depicted in FIG. 9 exists on both sides of pancake 40 for stability and strength. As can be seen, rod 96 extends to a cross axle 124 which eccentrically attaches to the reduction gears 100 on each Rhombic drive system on each side of pancake 40. The reduction gears operatively mesh with rack drive gear 102 (hidden in FIG. 11). Connecting arms 110 are connected into pancake base 52 by pin and bushings 128.

FIG. 12 shows the orientation between fifth-wheel pancake 40 and couplers 30. Couplers 30 have connecting arms 130 extending from their independent Rhombic drive system on either side of couplers 30.

FIG. 12 shows how conventional couplers 30 can be recessed into top surface 22 of rail truck frame 20 and how fifth-wheel pancakes 40 can be recessed within conventional couplers 30 and within top surface 22 of rail truck frame 20.

FIG. 13 depicts a cross-sectional view of a conventional hydraulic motor 132. An inner rotatable core is surrounded by a casing 136 leaving a fluid channel 138 therebetween. A rigid vane 140 is attached to core 134 and sealingly crosses through a channel 138. Fluid ports 142 and 144 allow for the entrance of pressurized fluid to fluid channel 138. Introduction of pressurized fluid into fluid port 144 would case rigid vane 140 to move counterclockwise within fluid channel 138 and thereby rotate pivot core 134. A drive shaft is attached to core 134 from which power is derived for the Rhombic drive systems and the beveled gearing.

The operation of hydraulic motors such as motor 132 is known to those skilled in the art.

FIG. 14 schematically depicts the connection of the various lifting and pivoting means. Motor 96 is depicted by dashed lines as shown. A means drive shaft 146 eminates from the output of motor 98. Linkage means 70 is powered by linkage means drive shaft 148 eminating from main drive shaft 146. A clutch means 150 is inserted within linkage means drive shaft 148 to selectively engage and disengage power to spindle 90 of tooth gear 88. The drive shafts and clutches can be of any sufficient construction, which is known in the art.

Next, drive shafts 152 are operatively connected to main drive 146 and have clutches 154 disposed thereon for selective operation of bevel drive shafts 122, which are operatively connected to beveled gear 120 to pivot pancakes 40.

Drive shafts 156 are operatively connected to main drive 146 and extend to operate the Rhombic drive system for lifting fifth-wheel pancakes 40. Clutches 158 are disposed therebetween for selective operation of those Rhombic drive systems. Similarly, drive shafts 160 are connected to the Rhombic drive systems (denoted by reference numerals 105) for the vertical adjustment of rail car couplers 30 and have clutches 162 disposed therebetween for their selective operation.

It can thus be seen that the total power system for the invention 10 operates from motor 98. Various drive shafts are linked to main drive shaft 146 and operate the various lifting and pivoting systems employed in the invention, which have heretofore been described. Automatic clutches are placed within each respective drive shaft to allow their selective control. The automatic clutches are those standard in the art and can be automatically remotely controlled, such as electronic radio control, or other means known in the art. The operation of the engine can also be remotely controlled. The control systems are separable from the power train.

FIG. 15 depicts the invention 10 as connected to intermodal container 12c and a conventional rail car 14 (by coupler 16), in form ready to travel along rails 28. Intermodal container 12 has been pivotally secured into fifth-wheel pancake 40, and fifth-wheel pancake 40 has been lowered into top surface 22 of rail truck frame 20. Rail coupler 30 on the other right of rail truck frame 20 has been raised to the level of conventional rail car couplers and has in fact been coupled with a conventional rail car coupler 16 of conventional rail car 14. Rail car coupler 30 at the left end of rail truck frame 20 has been lowered out of the way.

Linkage means 70 has been fully extended so that post locking hooks 72 have locked into on the coupling post 64 (hidden) of intermodal container 12, and on the right, coupling post 34 of coupler 30. Thus, it can be seen, that a uniform load line throughout the device has been formed along intermodal container 12c, pivot arm 58 with coupling post 34 (hidden), post locking hook 72, outer and inner linkage arms 76 and 78, coupling post 34, rail car coupler 30, and conventional rail car coupler 16 of conventional rail car 14.

FIG. 16 illustrates the control system for operating the remotely and automatically controllable pawls 184, 186, and 188 (not shown), which lock in the gears for vertical adjustment of pancakes 40 and couplers 30, and vertical post 82 of linkage means 70, respectively. The pawls may be operable from the exhaust of conventional air brakes of the invention 10. Master air cylinders 164 are connected to main air line 166 which is coupled throughout the train to operate air brakes on each rail truck. Air lines 168 extend from master air cylinder 164 to conventional air brakes 170. Air lines 172 extend from master air cylinder 164 into air control means 174 and 176. Air control means 174 controls the automatic setting and unsetting of pawls 186 (not shown) for the drive gear for raising and lowering conventional couplers 30. Air control means 176 automatically controls the setting and unsetting of pawls 184 (See FIG. 9) for drive gear 108 for raising and lowering fifth-wheel pancakes 40. Air line 178 extends from master cylinder 164 to air control means 180 which automatically sets and unsets the pawl 186 (See FIGS. 6, 7) to tooth gear 88 for raising and lowering vertical post 82 of linkage means 70.

Conventional rail truck air brakes utilize air pressure in the following manner. When air pressure is supplied to brakes 170, they are unlocked and allow free rolling movement of the rail trucks. When, however, air pressure is removed from brakes 170, the wheels 26 are automatically locked or braked. Thus, since lifting and lowering of conventional couplers 30, fifth-wheel pancakes 40, and pivoting of pancakes 40 is needed only when rail truck is at rest, i.e. braked, the exhaust air pressure from said brakes can be utilized to operate the air control means 174, 176 and 180 to set the respective pawls. Air control means 174, 176 and 180 can be of such design and operation as is known in the art.

In operation, the invention functions as described above. Depending upon what device is to be attached to the respective ends of intermodal rail truck 10 determines what operations are needed to be completed. For example, as shown in the drawings, if an intermodal container 12 is to be attached at one end and a conventional rail car 14 at the other, the rail coupler 30 must be lowered and the fifth-wheel pancake 40 pivoted and raised to accept the intermodal container. The fifth-wheel 40 is then lowered so that the load line of the intermodal container is at the required level. The rail coupling 30 on the other end is simply conventionally coupled to the conventional rail car 14. The linkage means 70 is then operated to grasp coupling posts 34 and 64 of the intermodal container and the conventional coupler 30, respectively, thus forming the uniform load line.

If intermodal containers are to be coupled at both ends of intermodal rail truck 10, the procedure heretofore described regarding the intermodal container is completed at both ends of rail truck 10.

If the intermodal rail truck 10 is needed to be transported between two conventional rail containers, the conventional couplers 30 at each end are coupled into conventional rail coupler 16 of conventional rail cars 14 and the linkage means is extended and grasps coupling post 34.

It is to be noted that pivoting of pancake 40 can be accomplished only when pancakes 40 are in their lowermost position. This automatically couples beveled gear 116 to vertical bevel gear 120 so that upon engagement of clutch 154, striker plate 42 pivots.

It will be appreciated that the present invention can take many forms and embodiments, and that the included preferred embodiment is given by way of example only and not by way of limitation to the invention. The true essence and spirit of this invention are defined in the appended claims. Variations obvious to one skilled in the art will be included within the invention defined by the claims.

For example, the lifting mechanisms, the pivoting mechanisms for the fifth-wheels, the linkage means, and the control means for remote and automatically controlling the above elements, can obtain different forms or constuction, to accomplish the same functions.

What is claimed is:

1. An intermodal rail truck and coupling means for adjoining two containers, wherein each said container is from the set comprised of an intermodal container and a conventional rail car, said intermodal rail truck and coupling means maintaining a uniform load line between said two adjoined containers, comprising:

a rail truck frame member having a top surface and a longitudinal axis generally parallel to said load line;

wheel supports on said frame member to secure rotatable rail wheels for operation on conventional railroad rails;

first coupler means at opposite end of said frame member being movable into alignment with said load line generallly parallel to said longitudinal axis for coupling with conventional couplers on conventional rail cars;

power means operatively connected to said frame member for moving said first coupler means out of said load line when not used for coupling with conventional rail cars;

first intermodal connection means on said frame member along said longitudinal axis for receipt and operative securing retainment of second intermodal connection means on said intermodal container along said load line; and linkage means for releasably linking said two containers generally parallel to said longitudinal axis at a unifrom height equaling that of said load line of conventional rail cars.

2. An intermodal rail truck and coupling system for adjoining two containers wherein each said container is from the set comprised of an intermodal container and a conventional rail car, said intermodal rail truck and coupling system maintaining a unifrom load line between said two adjoined containers, comprising:

a rail truck frame member having a top surface and a longitudinal axis generally parallel to said load line;

wheel supports on said frame member to which are secured rotatable rail wheels for operation on conventional railroad rails;

first coupler means on said rail truck located on opposite ends of said rail truck frame member along said longtudinal axis and being vertically adjustable upwardly to a first position allowing coupling with a conventional rail coupler of a conventional rail car along said load line and being lowerable to a second position below said first position when not coupled to conventional rail cars;

means for vertically adjusting said first coupler means on said rail truck secured to said rail truck frame member;

fifth-wheel pancake members positioned at opposite ends of said frame member along said longitudinal axis having means for receipt, securement, and support of a fifth-wheel kingpin of an intermodal container, said fifth-wheel pancake members being vertically adjustable from a first position whereby said load line of said intermodal container is aligned with the load line of conventional rail cars, to a second raised position whereby said intermodal container can be raised above said load line of a conventional rail car, each said fifth-wheel pancake member being pivotable about its vertical axis to allow said fifth-wheel kingpin of said intermodal containers to be inserted and removed transversely of said longitudinal axis;

means for vertically adjusting said fifth-wheel pancake members secured to said frame member;

means secured to said frame member for pivoting said fifth-wheel pancake members around a vertical axis;

linkage means for releasably adjoining said containers coupled to said intermodal rail truck along said load line; and means for releasably securing said linkabe means to said containers.

3. An intermodal rail truck and coupling means for adjoining two containers wherein each said container is from the set comprised of an intermodal container and a conventional rail car, said intermodal rail truck and coupling means maintaining a uniform load line between said two adjoining containers, comprising:

a rail truck frame member having a top surface and a longitudinal axis generally parallel to said load line;

wheel supports on said frame member to secure rotatable rail wheels for operation of conventional railroad rails;

at least one first coupler means on said frame member being movable into alignment with said load line generally parallel to said longitudinal axis for coupling with conventional couplers on conventional rail cars;

power means operatively connected to said frame member for moving said first coupler means out of said load line when not used for coupling with conventional rail cars;

at least one first intermodal connection means on said frame member along said longitudinal axis for receipt and operative securing retainment of a second intermodal connection means on said intermodal container along said load line; and linkage means for releasably linking said two containers generally parallel to said longitudinal axis at a uniform height equaling that of said load line of conventional rail cars.

4. The device of claim 3 wherein said rail truck frame member further comprises conventional rail truck suspension and braking systems.

5. The device of claim 3 wherein each said first coupler means on said rail truck is lowered into an aperture in said top surface of said frame member when not in use.

6. The device of claim 3 wherein said linkage means is retractable and fordable into a compartment in said top surface of said frame member.

7. The means of claim 3 wherein said two containers adjoined are an intermodal container and a conventional rail car.

8. The means of claim 3 wherein the two containers adjoined are two intermodal containers.

9. The means of claim 3 wherein the two containers adjoined are two conventional rail cars.

10. The means of claim 3 further comprising a raising means secured to said rail truck frame member and operatively connected to said first intermodal connection means for raising and lowering said first intermodal connection means.

11. The means of claim 3 wherein said second intermodal connection means on said intermodal containers comprises a fifth-wheel kingpin means for releasable securement to said first intermodal connection means on said frame member.

12. The device of claim 11 wherein said coupler means for said intermodal container further comprises an arm member having a first end pivotably secured to said fifth-wheel kingpin of said intermodal container and extending outwardly, said intermodal container having an open area to allow the horizontal movement of said arm from side to side.

13. The means of claim 11 wherein said first intermodal connection means comprises a fifth-wheel pancake member having means for receipt and operative securing retainment of said fifth-wheel kingpin of an intermodal container.

14. The means of claim 13 further comprising a pivoting means operatively connected to said pancake member for pivoting said pancake member to allow for removal of said kingpin of said intermodal container transversely of said longitudinal axis.

15. The device of claim 13 wherein each said fifth-wheel pancake member is lowerable into an aperture within said first coupler means on said rail truck and can be lowered into said top surface of said frame member.

16. The device of claim 15 wherein each said fifth-wheel pancake members is pivotable only when lowered into said top surface of said frame member.

17. The device of claim 13 wherein when one intermodal container is coupled with said intermodal rail truck and coupling means by pivotable retainment of said fifth-wheel kingpin and one fifth-wheel pancake member and a conventional rail car is coupled to said intermodal rail truck and coupling system by conventional coupling with said conventional coupler means, said linkage bar is coupled to said intermodal container by said fourth coupling means pivotally attached to said kingpin fifth-wheel, and is coupled to said conventional coupler means and said linkage bar, said conventional coupler means, and said fifth-wheel pancake member and said conventional coupler means are vertically adjusted so that said load line of said intermodal container, said linkage bar, and said coupling means are located along said load line of a conventional rail car.

18. The means of claim 3 wherein said linkage means comprises:

a linkage bar means positionable along and having rigidity along said load line generally parallel to said longitudinal axis of said frame member;

said linkage bar having a second coupler means at opposite ends;

third coupler means mounted along said longitudinal axis to innermost ends of said first coupling means on said rail truck frame member;

fourth coupling means pivotally mounted at opposite ends of said intermodal container;

said second coupler means being couplable with said third coupler means when corresponding said first coupler means on said rail truck is positioned for coupling with a conventional coupler on a conventional rail car; and said second coupler means being couplable with said fourth coupler means when a said intermodal container is positioned for coupling with said first intermodal connection means.

19. The device of claim 18 wherein two intermodal containers are coupled to said intermodal rail truck and coupling means by connection of said second intermodal connection means on said intermodal containers to said first intermodal connection means at opposite ends of said rail truck frame member, said second coupler means of said linkage bar are coupled with each said fourth coupling means on said intermodal containers and each said first coupler means on said rail car is moved and positioned so that the load lines of said linkage bar and said intermodal containers are positioned along the load line of a conventional rail car.

20. The device of claim 18 wherein said linkage bar is foldable within said compartment.

21. The device of claim 20 further comprising means for folding said linkage bar which allows said linkage bar to selectively automatically couple into said third and fourth couplers of said containers and when not in use automatically retract, uncouple, and fold into said compartment.

22. The device of claim 18 wherein said second intermodal connection means of said intermodal container and said third coupler means comprise upper and lower brackets which have a cylindrical post disposed therebetween.

23. The device of claim 22 wherein said second coupler means of said linkage bar comprises hook members which upon linkage with said second intermodal connection means of said intermodal container, hooks around said post member to maintain a rigidity along the load line of said intermodal container.

24. The device of claim 22 wherein said second coupler means of said linkage bar comprises hook members which upon linkage with said first coupler means of said rail truck hooks around said post member to maintain a rigidity along the load line of said conventional rail car.

* * * * *